United States Patent
Baek et al.

(10) Patent No.: US 8,349,280 B2
(45) Date of Patent: Jan. 8, 2013

(54) MULTI WATER-GAS SHIFT MEMBRANE REACTOR FOR PRODUCING HIGH CONCENTRATION HYDROGEN AND METHOD FOR PRODUCING HYDROGEN USING THE SAME

(75) Inventors: Il Hyun Baek, Daejeon (KR); See Hoon Lee, Daejeon (KR); Jeong Nam Kim, Daegu (KR)

(73) Assignee: Korea Institute of Energy Research, Daejeon (KR)

( * ) Notice: Subject to any disclaimer, the term of this patent is extended or adjusted under 35 U.S.C. 154(b) by 6 days.

(21) Appl. No.: 12/715,318

(22) Filed: Mar. 1, 2010

(65) Prior Publication Data

US 2011/0081291 A1    Apr. 7, 2011

(30) Foreign Application Priority Data

Oct. 7, 2009    (KR) .................. 10-2009-0095166

(51) Int. Cl.
*B01D 63/00*    (2006.01)
(52) U.S. Cl. ......... 422/617; 422/600; 423/655; 423/656
(58) Field of Classification Search .................. 422/600, 422/617; 423/655, 656
See application file for complete search history.

(56) References Cited

U.S. PATENT DOCUMENTS

| | | | | |
|---|---|---|---|---|
| 4,413,041 A | * | 11/1983 | Hegedus | 429/465 |
| 6,231,831 B1 | * | 5/2001 | Autenrieth et al. | 423/648.1 |
| 6,350,297 B1 | * | 2/2002 | Doyle et al. | 95/55 |
| 6,409,974 B1 | * | 6/2002 | Towler et al. | 422/172 |

FOREIGN PATENT DOCUMENTS

| | | |
|---|---|---|
| KR | 1020040036106 A | 4/2004 |
| KR | 1020050103568 A | 11/2005 |
| KR | 100816879 B1 | 3/2008 |
| KR | 1020090015041 A | 2/2009 |

* cited by examiner

*Primary Examiner* — Paul Wartalowicz
(74) *Attorney, Agent, or Firm* — Kile Park Goekjian Reed & McManus PLLC

(57) ABSTRACT

Disclosed are a multi water-gas shift membrane reactor for producing high-concentration hydrogen and a method for producing hydrogen using the same. More specifically, disclosed are a multi water-gas shift membrane reactor wherein high-concentration carbon monoxide, obtained by dry-gasification performed by reacting dry bituminous coal with water and oxygen, reacts with water gas in the presence of catalysts in a single reactor, to produce hydrogen and carbon dioxide and separate highly pure hydrogen and carbon dioxide through a separation membrane arranged in a low region, and a method for producing hydrogen.

3 Claims, 6 Drawing Sheets

MULTI WATER-GAS SHIFT MEMBRANE REACTOR FOR PRODUCING HIGH CONCENTRATION HYDROGEN AND METHOD FOR PRODUCING HYDROGEN USING THE SAME

BACKGROUND OF THE INVENTION

1. Field of the Invention

The present invention relates to a multi water-gas shift membrane reactor for producing high-concentration hydrogen and a method for producing hydrogen using the same. More specifically, the present invention relates to a multi water-gas shift membrane reactor wherein high-concentration carbon monoxide, obtained by dry-gasification performed by reacting dry bituminous coal with water and oxygen, reacts with water gas in the presence of catalysts in a single reactor, to produce hydrogen and carbon dioxide and separate highly pure hydrogen and carbon dioxide through a separation membrane arranged in a low region, and a method for producing hydrogen. That is, with respect to a synthetic gas containing hydrogen, carbon monoxide, carbon dioxide, hydrogen sulfide, hydrogen monoxide, etc., generated by partial oxidation and vapor gasification at a temperature of 1,300 to 1,500° C., 50-70% of carbon monoxide is converted into 99.9% or higher of hydrogen and 90% or higher of carbon dioxide in a multi water-gas shift membrane reactor containing vapor and low-temperature and high-temperature catalysts.

2. Description of the Related Art

Coal gasification to convert, coal, the most abundant fossil resource, into hydrogen, a next-generation energy resource, in order to cope with concerns about environmental pollution and depletion of resources such as petroleum or natural gas, attracts much attention.

Advantageously, coal gasification enables mass-production of hydrogen, widely considered to be the most environmentally friendly energy, and low-cost disposal of greenhouse gas, the fatal disadvantage of fossil fuels. Due to these advantages, a great deal of research is conducted to develop coal gasification technologies in many nations.

In the process of hydrogen production using coal gasification, more carbon monoxide than hydrogen is produced, depending on factors such as the type of coal used, gasifying agents, type of reactors and operation conditions. In particular, dry-gasification, wherein coal is directly injected without using a slurry-type coal, yields 50-70% by volume of carbon monoxide.

Accordingly, conversion of carbon monoxide into hydrogen is required for application to green-energy generation means such as hydrogen fuel cells, hydrogen engines and high-efficiency gas turbines. In addition, to realize low-cost separation of carbon dioxide, the advantage of the gasification process, high-concentration hydrogen streams composed of only hydrogen and carbon dioxide should be finally formed by converting carbon monoxide into hydrogen.

Generally, carbon monoxide is converted into hydrogen using a water gas shift reaction wherein carbon monoxide reacts with water to convert carbon monoxide into hydrogen and carbon dioxide, but the water gas shift reaction is unsuitable for use under the gasification condition that carbon monoxide is present in an amount of 50 to 70% by volume.

There are conventional water gas shift reaction-related technologies. For example, Korean Patent No. 612,956 discloses a catalyst for high-concentration conversion reactions and a method for preparing the same, and Korean Patent No. 462,286 discloses a water gas-converting catalyst wherein ceramic is incorporated into a metal and a method for preparing the same and Korean Patent No. 816,879 discloses a membrane reactor simultaneously performing reactions for modifying hydrocarbon water vapor and removing carbon monoxide and a method for preparing hydrogen using the same. Furthermore, Korean Patent Publication No. 2009-0015041 discloses a method for preparing carbon dioxide and hydrogen from a synthetic gas, as a process for modifying a natural gas comprising reaction of water gas.

Accordingly, there is a need for a single apparatus and a method for simultaneously reacting 50 to 70% by volume of carbon monoxide with water to produce hydrogen and carbon dioxide and separating the same, in order to improve preparation efficiency of hydrogen as a clean energy resource using dry coal gasification and to reduce process costs.

SUMMARY OF THE INVENTION

Therefore, the present invention has been made in view of the above problems, and it is one object of the present invention to provide a multi water-gas shift membrane reactor wherein 50 to 70% by volume of carbon monoxide produced in a dry gasification apparatus reacts with vapor to convert carbon monoxide into hydrogen and simultaneously to separate 99% or higher of hydrogen and 90% or higher of carbon dioxide, thereby realizing production of high-concentration hydrogen, and a method for producing hydrogen using the same.

In particular, the reactor is partitioned into an upper portion, a middle portion and a lower portion, wherein primary catalyst reaction occurs in the upper portion at a high temperature of 300 to 450° C., secondary catalyst reaction occurs in the middle portion at a low temperature of 180 to 250° C. and produced hydrogen and carbon dioxide are separated through a separation membrane partitioning the middle portion from the lower portion.

In accordance with the present invention, the above and other objects can be accomplished by the provision of a multi water-gas shift membrane reactor for reacting a synthetic gas containing high-concentration carbon monoxide with a catalyst in a reactor provided with a barrier rib to partition an inner region into an upper portion, a middle portion and a lower portion, to convert the synthetic gas into hydrogen, the multi water-gas shift membrane reactor including: a multi reactor provided in a upper region with a porous barrier rib to support the catalyst, in a lower region with a separation membrane to separate hydrogen, the separation membrane partitioning an inner region of the multi reactor into an upper reaction chamber, a lower reaction chamber and a discharge chamber; a first catalyst layer and a second catalyst layer laminated on the barrier rib and the separation membrane, respectively; a synthetic gas supply pipe connected to the first catalyst layer of the upper reaction chamber, to supply a synthetic gas containing high-concentration carbon monoxide; a steam supply pipe to supply steam, connected to an upper region of the first catalyst layer of the upper reaction chamber; a first outlet connected to the discharge chamber, to discharge hydrogen passing through the separation membrane; and a second outlet, connected to an upper region adjacent to the separation membrane, to discharge the reaction gas not passing through the separation membrane.

In accordance with another aspect, provided is a method for producing hydrogen using the multi water-gas shift membrane reactor according to the present invention, the method including: supplying synthetic gas containing a great amount of carbon monoxide and steam to a reactor; passing the synthetic gas and steam through an HTS catalyst layer to perform catalyst reaction at a high temperature; heat-exchanging the high-temperature reaction gas to reduce the temperature thereof; passing the gas through LTS catalyst to perform catalyst reaction at a low temperature; separating hydrogen from the synthetic gas having undergone the low-temperature catalyst reaction through a separation membrane; and discharging the separated hydrogen and the remaining synthetic gas to the outside.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
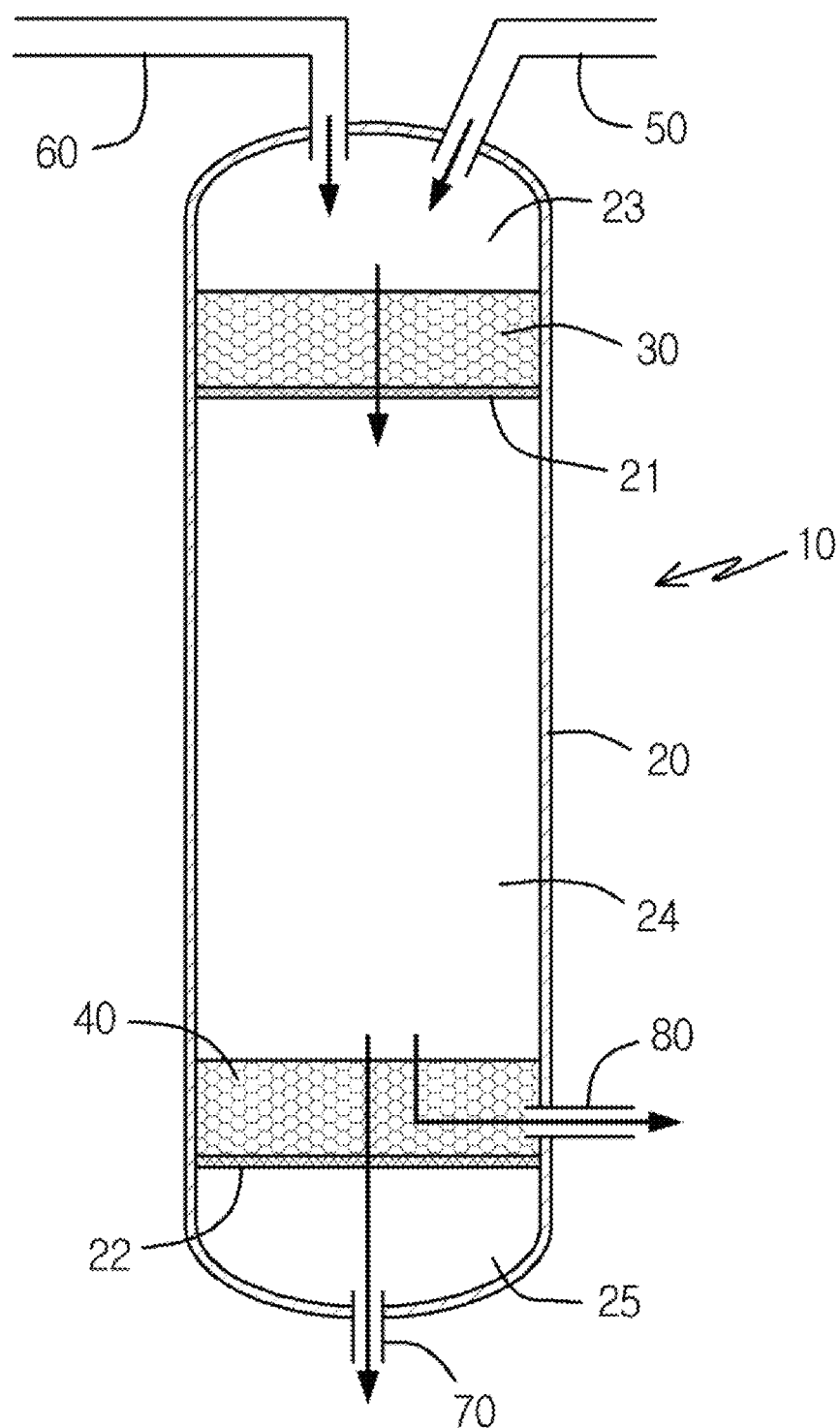
FIGS. 1 to 3 are schematic views illustrating a multi water-gas shift membrane reactor using a gasified synthetic gas according to the present invention.

Hereinafter, a multi water-gas shift membrane reactor using a gasified synthetic gas according to the present invention will be described with reference to FIG. 1 in more detail.

A multi water-gas shift membrane reactor 10 comprises a multi reactor 20 which is partitioned through a porous barrier rib 21 and a separation membrane 22. The multi reactor is provided in an upper portion with the porous barrier rib 21 and in a lower portion with the separation membrane 22, to partition an inner region into an upper reaction chamber 23, a lower reaction chamber 24 and a discharge chamber 25.

A first catalyst is deposited to a predetermined thickness on the porous barrier rib 21 provided in the upper reaction chamber of the multi reactor 20 to form a first catalyst layer 30, and a second catalyst is deposited to a predetermined thickness on the separation membrane 22 provided in the lower reaction chamber to form a second catalyst layer 40. The catalysts constituting the first and second catalyst layers are high temperature shift (HTS) and low temperature shift (LTS) catalysts, respectively. Catalyst conversion reactions are preferably performed using these different catalysts at different temperatures, to improve hydrogen conversion efficiency.

That is, as shown in FIG. 1, the HTS catalyst is used for the first catalyst layer 30 in the upper reaction chamber 23 and the LTS catalyst is used for the second catalyst layer 40 in the lower reaction chamber 24, and vice versa. That is, catalyst conversion reactions may be performed using an LTS catalyst for the first catalyst layer and an HTS catalyst for the second catalyst layer at different temperatures.

Then, the upper reaction chamber 23 is connected to a synthetic gas supply pipe 50 to supply a synthetic gas containing high-concentration carbon monoxide discharged during dry coal gasification to the first catalyst layer 30, and to a steam supply pipe 60 to supply steam, enabling reaction with the synthetic gas via the catalyst.

Figure 2:
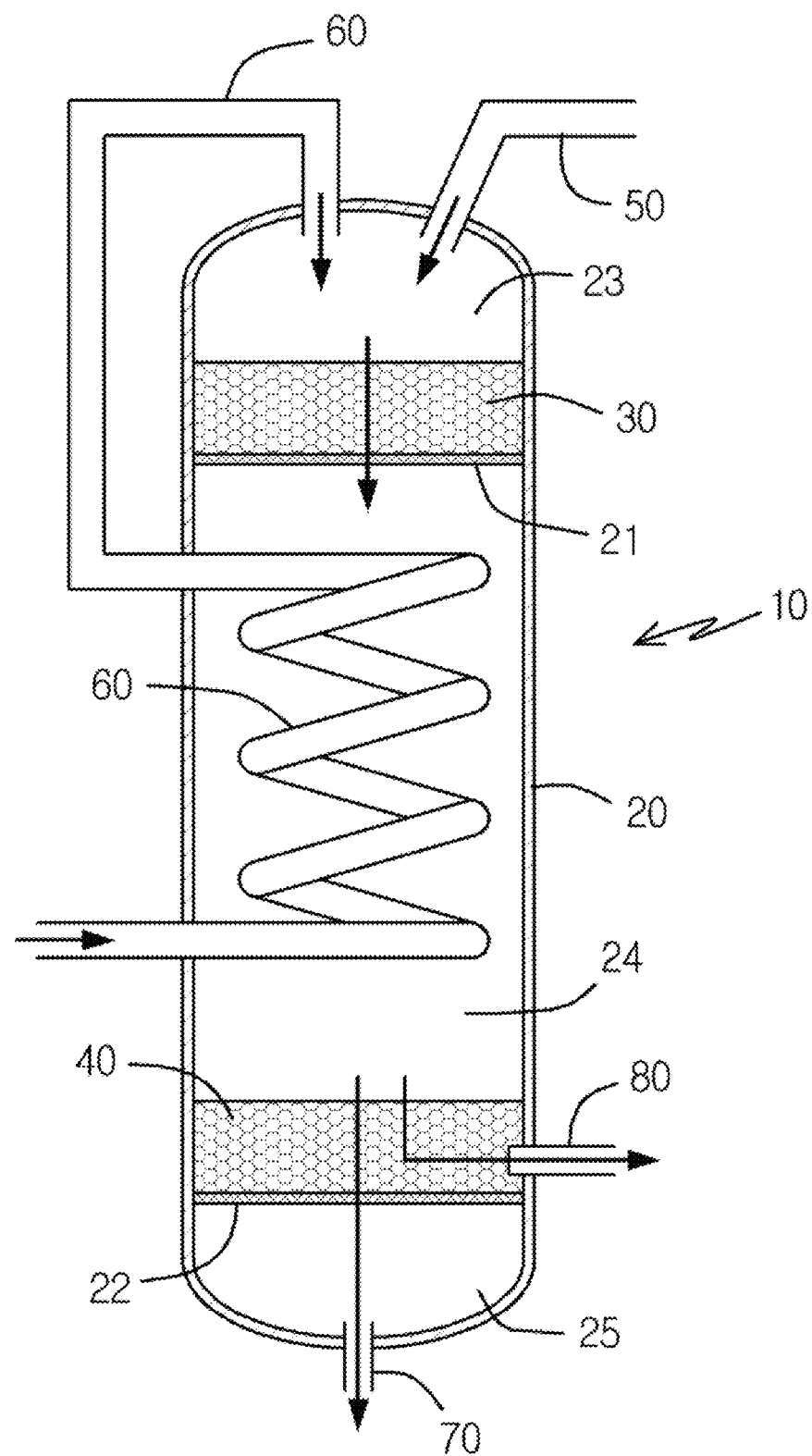

In addition, the steam supply pipe 60, laid between the second catalyst layer 40 and the porous barrier rib 21 in the lower reaction chamber 24, is used as a heat exchanger to collect high-temperature reaction heat. As shown in FIG. 2, a middle end of the steam supply pipe 60 is spirally laid in the lower reaction chamber 24. Liquid moisture supplied to the steam supply pipe 60 thermally exchanges with the lower reaction chamber 24 and is then undergoes phase-transition into steam, while passing through the spiral pipe of the lower reaction chamber. Accordingly, steam can be supplied without any additional steam generator by allowing the phase-transited steam to flow in the upper reaction chamber 23. Based on this structure, the gas passing through the second catalyst layer 40 has a lower temperature than the gas passing through the first catalyst layer 30, thus performing catalyst reactions using the HTS catalyst for the first catalyst layer 30 and the LTS catalyst for the second catalyst layer 40 at different temperatures and thereby improving hydrogen conversion efficiency.

In the case where, in a reverse structure, a heater is mounted on the lower reaction chamber, instead of the spiral steam supply pipe, catalyst reaction is performed using the LTS catalyst for the first catalyst layer and the HTS catalyst for the second catalyst layer, respectively, by supplying a low-temperature synthetic gas thereto, heat is supplied to the gas passing through the first catalyst layer to allow the gas to be heated, and the gas passes through the second catalyst layer composed of the HTS catalyst to perform hydrogen conversion.

Meanwhile, the separation membrane 22 is a barrier rib to partition the lower reaction chamber 24 and the discharge chamber 25, which allows passage of only hydrogen among the synthetic gas which underwent catalyst reaction on the second catalyst layer 40. A great deal of research has been conducted into materials for the separation membrane and a representative material thereof is palladium (Pb). The hydrogen separated by the separation membrane 22 is discharged through a first outlet 70 provided in the discharge chamber 25 and the remaining hydrogen and other synthetic gases in the separation membrane are discharged through a second outlet 80 provided in the lower reaction chamber.

Figure 3:
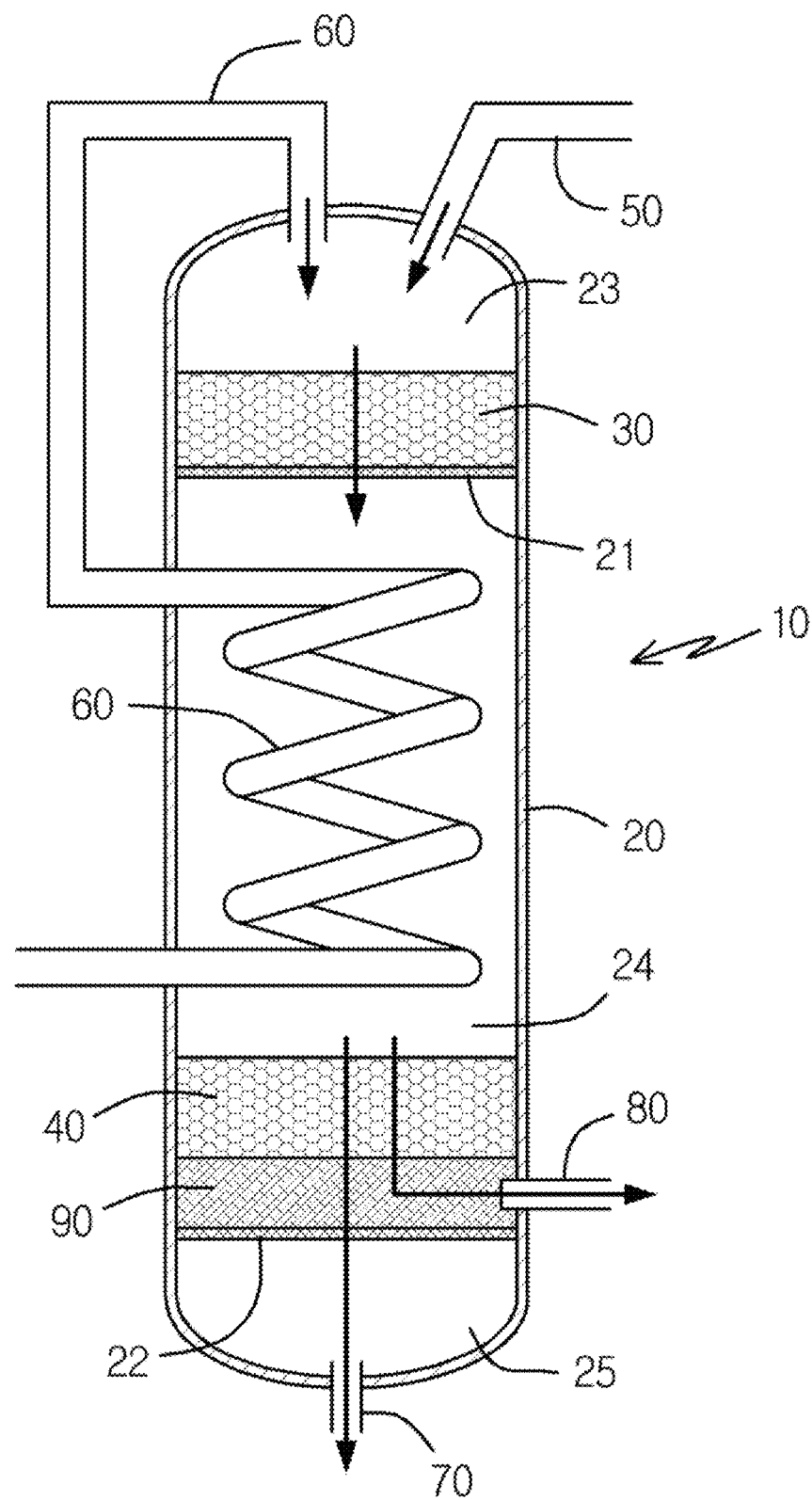

When the second outlet 80 is connected to the side of the second catalyst layer 40, the second catalyst may be discharged through the second outlet. To prevent this discharge, as shown in FIG. 3, a support layer 90 is provided between the second catalyst layer 40 and the separation membrane 22 to connect the second outlet 80 to the side of the support layer and the second outlet 80 communicates with the side of the support layer. Based on this structure, the gas, which participates in the catalyst reaction, while passing through the second catalyst layer, contacts the separation membrane through the support layer, to allow hydrogen to pass through the separation membrane and then to be discharged through the first outlet 70 and to allow other synthetic gases not passing through the separation membrane to be discharged through the second outlet 80 communicating with the side of the support layer. The material for the supporter constituting the support layer 90 may be selected from materials preventing permeation of the second catalyst and is preferably alumina.

Figure 4:
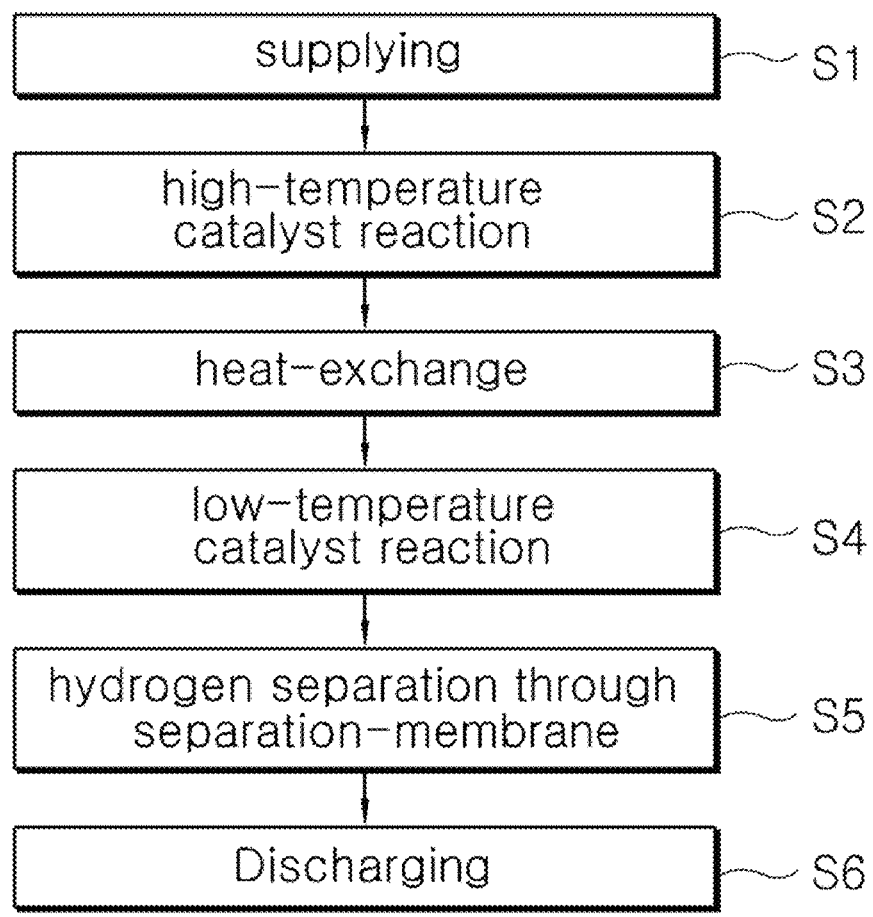
FIG. 4 is a flow chart illustrating a hydrogen production method using the multi water-gas shift membrane reactor according to the present invention.

The hydrogen production method using the multi water-gas shift membrane reactor will be described with reference to FIG. 4.

A first step of the method is supplying (S1). In this step, a synthetic gas containing a large amount of carbon monoxide and steam is supplied through the synthetic gas supply pipe and the steam supply pipe to the upper reaction chamber of the multi water-gas shift membrane reactor.

The synthetic gas and steam pass through the first catalyst layer, the HTS catalyst layer, laminated on the upper reaction chamber at a high temperature of 300 to 450° C., to perform high-temperature catalyst reaction (S2), enabling hydrogen exchange at a high temperature using the HTS catalyst.

The gas reacted at the high temperature in the lower reaction chamber moves to the second catalyst layer, the LTS catalyst layer. At this time, heat exchange is performed (S3). In this step, the temperature of the gas can be decreased via heat exchange using various methods. For example, as shown in the system of the present invention, a portion of the steam supply pipe is located in the lower reaction chamber and is spirally laid, and liquid moisture flowing in the pipe absorbs heat of the lower reaction chamber to lower the temperature of gas which underwent high-temperature water gas shift reaction.

The heat-exchanged gas passes through the LTS catalyst layer to perform low-temperature catalyst reaction (S4). In this step, hydrogen conversion is performed via catalyst reaction at a low temperature of 180 to 250° C.

The synthetic gas, which sequentially underwent the high-temperature catalyst reaction and the low-temperature catalyst reaction, is subjected to separation-membrane hydrogen separation to separate hydrogen contained in the synthetic gas through the separation membrane (S5). In this step, the separation membrane is a film provided with a plurality of microholes, which only allow permeation of hydrogen. The resulting synthetic gas is sent to the separation membrane to obtain high-concentration hydrogen.

After the hydrogen separation, hydrogen separated by the separation membrane, and non-separated and remaining synthetic gas are discharged through the first outlet and the second outlet, respectively (S6). As a result, hydrogen converted by the catalyst reaction from the synthetic gas is collected.

The present invention will be described with reference to the following Example.

EXAMPLE 1

Water Gas Shift Reaction Using Model Synthetic Gas for Dry Coal Gasification

The water gas shift reactor used herein was the reactor of the present invention which has an inner diameter of 25 mm and a height of 500 mm.

The high-temperature catalyst for the water gas shift reaction herein used was a tablet-type catalyst having a diameter of 3.2 mm, which is made of aluminum oxide, chrome oxide or copper oxide and is deposited to a thickness of 2.7 cm in an amount of 20 g.

The low-temperature catalyst having the equivalent amount and thickness to the high-temperature catalyst is a tablet-type catalyst having a diameter of 3.2 mm, which is made of aluminum oxide, chrome oxide or copper oxide.

The synthetic gas and vapor were injected from an upper region of the reactor.

A general catalyst used herein was activated under hydrogen atmosphere for a sufficient time prior to the experiment.

Non-reacted vapor left after the reaction was captured by a cooling collector.

The injected model synthetic gas was composed of 60-65 vol % of CO, 25-35 vol % of $H_2$, and 5-15 vol % of $CO_2$, based on representative compositions of the synthetic gas discharged during dry coal gasification.

In addition, a ratio of $H_2O$ to CO is in the range of 2-4 and the results are shown in Table 1 below:

TABLE 1

| | Conditions | | | | | | First outlet | | | | Second outlet | | | |
|---|---|---|---|---|---|---|---|---|---|---|---|---|---|---|
| Ex. | flow | $H_2$ | CO | $CO_2$ | S/C | Temp. | $H_2$ | CO | $CO_2$ | L | $H_2$ | CO | $CO_2$ | L |
| 1 | 0.20 | 30 | 65 | 5 | 2.5:1 | 350 | 0.1803 | 0 | 0 | 0.1803 | 0.0138 | 0.0010 | 0.1333 | 0.1481 |
| 2 | 0.25 | 30 | 65 | 5 | 2.5:1 | 350 | 0.2235 | 0 | 0 | 0.2235 | 0.0174 | 0.0012 | 0.1679 | 0.1865 |
| 3 | 0.30 | 30 | 65 | 5 | 2.5:1 | 350 | 0.2673 | 0 | 0 | 0.2673 | 0.0209 | 0.0015 | 0.2016 | 0.2240 |
| 4 | 0.35 | 30 | 65 | 5 | 2.5:1 | 350 | 0.3102 | 0 | 0 | 0.3102 | 0.0245 | 0.0017 | 0.2357 | 0.2619 |
| 5 | 0.25 | 30 | 65 | 5 | 2:1 | 350 | 0.2243 | 0 | 0 | 0.2243 | 0.0174 | 0.0012 | 0.1675 | 0.1861 |
| 6 | 0.25 | 30 | 65 | 5 | 3:1 | 350 | 0.2246 | 0 | 0 | 0.2246 | 0.0174 | 0.0012 | 0.1675 | 0.1861 |
| 7 | 0.25 | 30 | 65 | 5 | 4:1 | 350 | 0.2260 | 0 | 0 | 0.2260 | 0.0173 | 0.0012 | 0.1664 | 0.1849 |
| 8 | 0.25 | 30 | 65 | 5 | 2.5:1 | 350 | 0.2244 | 0 | 0 | 0.2244 | 0.0174 | 0.0012 | 0.1678 | 0.1864 |
| 9 | 0.25 | 30 | 65 | 5 | 2.5:1 | 400 | 0.2229 | 0 | 0 | 0.2229 | 0.0174 | 0.0012 | 0.1681 | 0.1867 |
| 10 | 0.25 | 30 | 60 | 10 | 2.5:1 | 350 | 0.2132 | 0 | 0 | 0.2132 | 0.0173 | 0.0012 | 0.1681 | 0.1866 |
| 11 | 0.25 | 35 | 60 | 5 | 2.5:1 | 350 | 0.2267 | 0 | 0 | 0.2267 | 0.0160 | 0.0012 | 0.1544 | 0.1716 |
| 12 | 0.25 | 25 | 60 | 15 | 2.5:1 | 350 | 0.1993 | 0 | 0 | 0.1993 | 0.0187 | 0.0012 | 0.1787 | 0.1986 |

(Unit: L/min)

In accordance with the high-temperature water gas shift reaction with a hydrogen conversion of 80 to 95%, carbon monoxide (CO) is discharged in a small amount of 2-6% by volume. After the low-temperature water gas shift reaction, monoxide (CO) is reduced to 0.3% by volume and a gas having the composition of the first outlet and the second outlet is discharged through the separation membrane.

In addition, to allow the gas initially injected in the reactor to react thoroughly, the reaction was carried out with respective amounts of components for about one hour, and outlet gas flow was analyzed in real time by gas chromatography to confirm reactivity.

Figure 5:
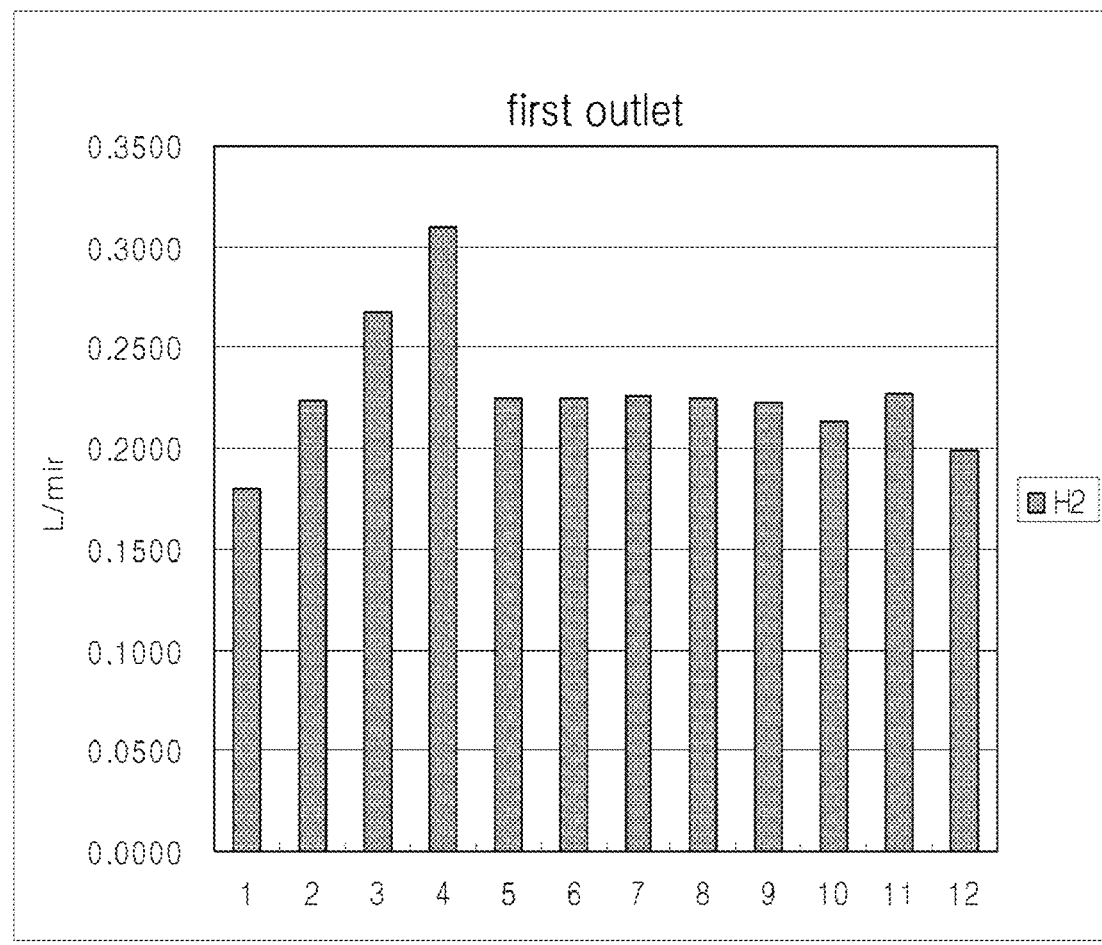
FIG. 5 is a graph showing hydrogen flow discharged through a separation membrane to a first discharge pipe in a discharge chamber according to one embodiment of the present invention.
Figure 6:
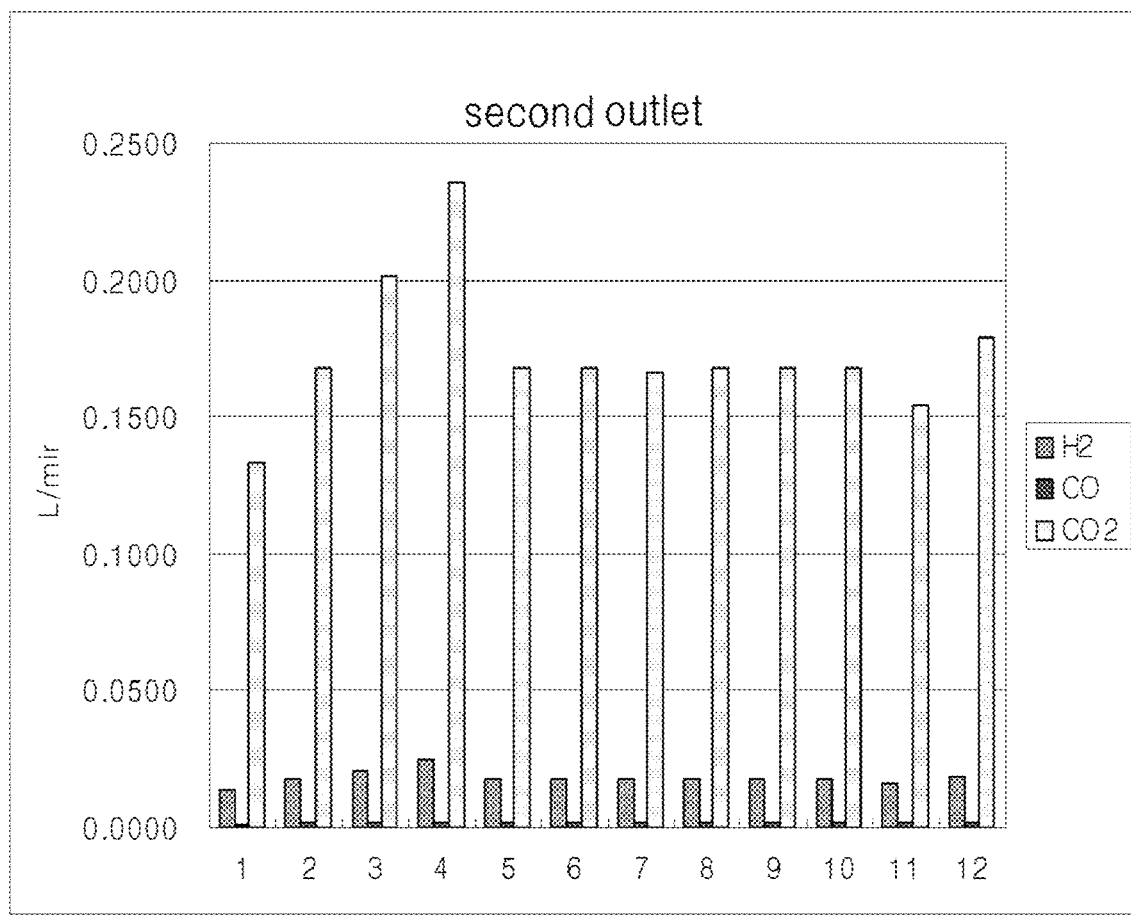
FIG. 6 is a gas flow discharged from a second discharge pipe in a lower reaction chamber according to one embodiment of the present invention.

FIG. 5 shows a hydrogen flow discharged through a separation membrane to a first discharge pipe in a discharge chamber, and FIG. 6 shows a gas flow discharged from the second discharge pipe in the lower reaction chamber.

As can be seen from Table 1 and FIGS. 5 and 6, 65% by volume of the carbon monoxide injected is converted into carbon dioxide and hydrogen and is discharged outside of the reactor.

During the water gas shift reaction, hydrogen and carbon dioxide are discharged, while a mix gas containing 99.9% by volume of hydrogen and 90% or higher of carbon dioxide is discharged from the multi water-gas shift membrane reactor. The water gas shift reaction conditions and carbon monoxide concentration may affect production yields, and production yields and concentrations can thus be controlled by control over operation conditions and exclusive or continuous operation of high-temperature and low-temperature catalyst processes.

As apparent from the fore-going, the present invention provides a multi water-gas shift membrane reactor wherein a synthetic gas containing high-concentration carbon monoxide, obtained by bituminous coal gasification, reacts with water in the presence of catalysts to produce hydrogen, and a method for producing hydrogen.

That is, with respect to a synthetic gas containing hydrogen, carbon monoxide, carbon dioxide, hydrogen sulfide, hydrogen monoxide, etc. generated by partial oxidation and vapor gasification at a temperature of 1,300 to 1,500° C., 50-70% of carbon monoxide is converted into hydrogen in a multi water-gas shift membrane reactor containing vapor and low-temperature and high-temperature catalysts.

In particular, the multi water-gas shift membrane reactor comprises a single reactor including a high-temperature catalyst reaction chamber, low-temperature catalyst reaction chamber and a hydrogen separation chamber, wherein water gas shift reactions are substantially performed at different temperatures, to maximize hydrogen conversion ratio and separate 99% or higher of highly pure hydrogen, thereby significantly reducing an installation area, and the method for producing hydrogen using the same.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi water-gas shift membrane reactor for reacting a synthetic gas containing 50-70% carbon monoxide with a catalyst in a reactor to convert the synthetic gas into hydrogen, the multi water-gas shift membrane reactor comprising:

a multi reactor wherein a porous barrier rib to support the catalyst is provided in a upper region of the multi reactor, and a separation membrane to separate hydrogen is provided in a lower region of the multi reactor, the separation membrane partitioning an inner region of the multi reactor into a lower reaction chamber and a discharge chamber;

a first catalyst layer and a second catalyst layer laminated on the barrier rib and the separation membrane, respectively;

a synthetic gas supply pipe connected to the first catalyst layer of an upper reaction chamber, to supply a synthetic gas containing 50-70% carbon monoxide;

a steam supply pipe to supply steam, connected to an upper region of the first catalyst layer of the upper reaction chamber;

a first outlet connected to the discharge chamber, to discharge hydrogen passing through the separation membrane; and a second outlet connected to the second catalyst layer, to discharge synthetic gas not passing through the separation membrane, wherein the first catalyst layer is composed of an HTS catalyst to allow a catalyst reaction of a high-temperature synthetic gas; and the second catalyst layer is composed of an LTS catalyst to allow a catalyst reaction of a low-temperature synthetic gas, wherein the steam supply pipe is laid in a middle of the lower reaction chamber to collect high-temperature reaction heat, phase-transfer moisture into stream in the pipe and thus supply the steam to the upper reaction chamber.

2. The reactor according to claim 1, further comprising:

a support layer arranged between the separation membrane and the second catalyst layer, wherein the second outlet is connected to the support layer to prevent the catalyst from being discharged through the second outlet.

3. The reactor according to claim 2, wherein the separation membrane is composed of palladium and the material constituting the support layer is alumina.

* * * * *